(12) United States Patent
Stefanov et al.

(10) Patent No.: US 12,521,938 B2
(45) Date of Patent: Jan. 13, 2026

(54) APPARATUS FOR PRODUCING A THREE-DIMENSIONAL OBJECT

(71) Applicant: SPECTROPLAST AG, Schlieren (CH)

(72) Inventors: Petar Stefanov, Zürich (CH); Manuel Schaffner, Zürich (CH)

(73) Assignee: SPECTROPLAST AG, Schlieren (CH)

( * ) Notice: Subject to any disclaimer, the term of this patent is extended or adjusted under 35 U.S.C. 154(b) by 156 days.

(21) Appl. No.: 18/279,724

(22) PCT Filed: Mar. 14, 2022

(86) PCT No.: PCT/EP2022/056522
§ 371 (c)(1),
(2) Date: Aug. 31, 2023

(87) PCT Pub. No.: WO2022/194769
PCT Pub. Date: Sep. 22, 2022

(65) Prior Publication Data
US 2024/0140021 A1  May 2, 2024

(30) Foreign Application Priority Data
Mar. 15, 2021  (EP) ..................... 21162560

(51) Int. Cl.
*B29C 64/214* (2017.01)
*B29C 64/124* (2017.01)
(Continued)

(52) U.S. Cl.
CPC .......... *B29C 64/124* (2017.08); *B29C 64/214* (2017.08); *B29C 64/245* (2017.08); *B33Y 30/00* (2014.12)

(58) Field of Classification Search
None
See application file for complete search history.

(56) References Cited

U.S. PATENT DOCUMENTS

| | | | | |
|---|---|---|---|---|
| 2015/0224710 A1* | 8/2015 | El-Siblani | ............... | B29C 64/40 425/150 |
| 2017/0057177 A1* | 3/2017 | Ferguson | ............... | B33Y 30/00 |
| 2018/0333913 A1* | 11/2018 | Lin | ........................ | B29C 64/264 |

FOREIGN PATENT DOCUMENTS

| | | | | |
|---|---|---|---|---|
| CN | 109624313 A | * | 4/2019 | ............ B28B 1/001 |
| CN | 209718634 U | | 12/2019 | |

OTHER PUBLICATIONS

EPO (Rijswijk, NL), English language version of the International Search Report, Form PCT/ISA/210, for International Application PCT/EP2022/056522, Jun. 22, 2022 (2 pages).

* cited by examiner

*Primary Examiner* — Yung-Sheng M Tsui
(74) *Attorney, Agent, or Firm* — Pauley Erickson & Swanson

(57) ABSTRACT

An apparatus for producing a three-dimensional object comprises an energy source of electro-magnetic radiation and an open-top container having a closed bottom and sidewalls, the closed bottom being at least in part transparent for the electro-magnetic radiation. The open-top container is configured to contain solidifiable paste which solidifies in response to the electro-magnetic radiation supplied by the energy source. A build platform moves in a vertical direction vertically above the container and moves away from the closed bottom during an object building process. A paste spreader assembly moves horizontally along a first direction during a paste spreading process to evenly spread and define a layer thickness of the solidifiable paste at least in part across the closed bottom of the container. The paste spreader assembly comprises at least one blade having at least one planar facet which faces the bottom of the container. The blade is rotatable from a non-operative to an operative position around a horizontal axis orthogonal to the first (Continued)

direction, and in that one planar facet in the operative position of the blade is at an angle γ relative to the closed bottom and at least partially contacts the paste during the paste spreading process, and in that the angle γ is in a range of $0° \leq \gamma \leq 45°$.

12 Claims, 7 Drawing Sheets

(51) Int. Cl.
    *B29C 64/245*     (2017.01)
    *B33Y 30/00*     (2015.01)

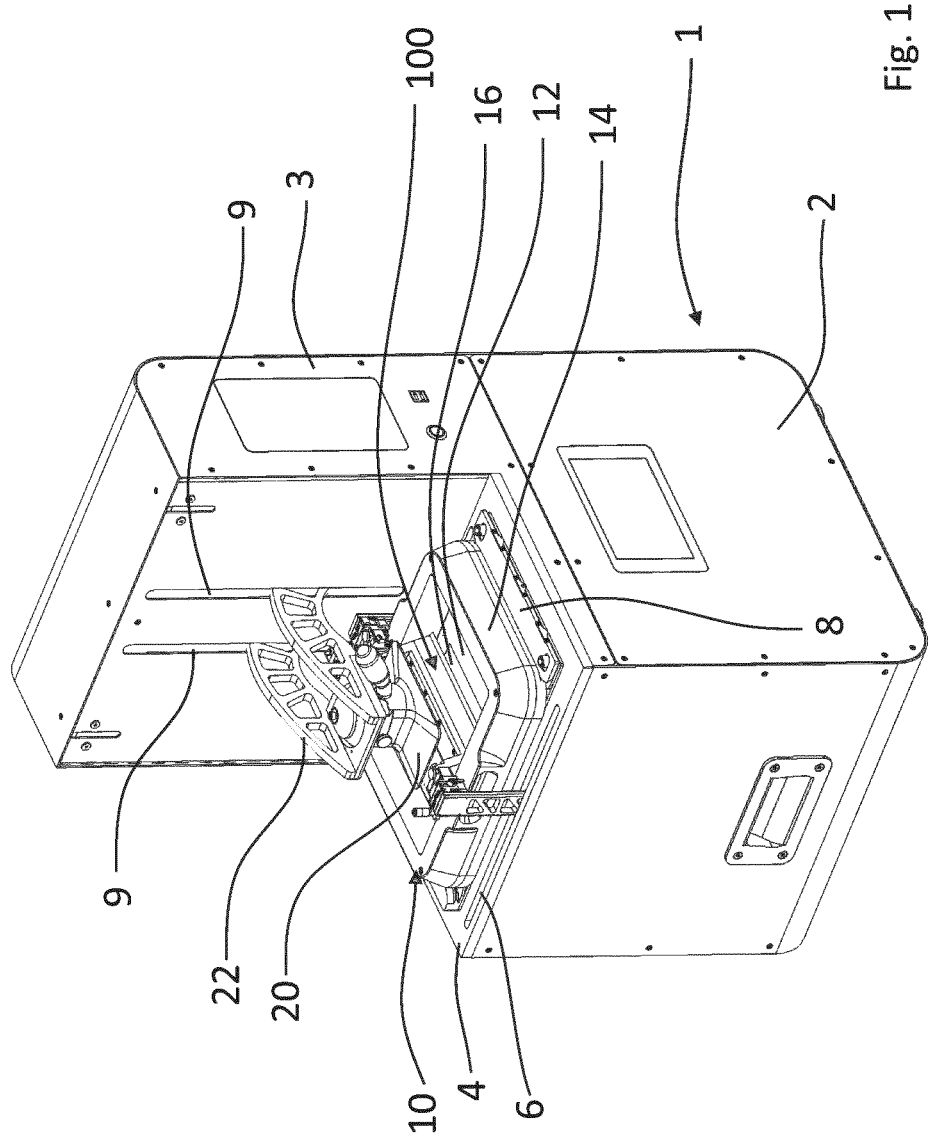
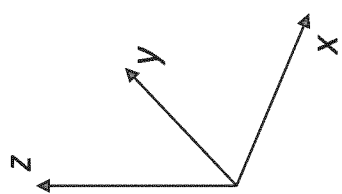
Fig. 1

APPARATUS FOR PRODUCING A THREE-DIMENSIONAL OBJECT

CROSS REFERENCE TO RELATED APPLICATION

This application is a National Phase filing in the United States, under 35 USC § 371, of PCT International Patent Application PCT/EP2022/056522, filed on 14 Mar. 2022 which claims the priority of European Patent Application No. EP 21162560.3, filed 15 Mar. 2021.

The above-referenced applications are hereby incorporated by reference herein in their entirety and are made a part hereof, including but not limited to those portions which specifically appear hereinafter.

BACKGROUND OF THE INVENTION

Field of the Invention

The present invention relates to an apparatus for producing a three-dimensional object, and more specifically, to an apparatus for manufacturing a three-dimensional object from a solidifiable paste.

Discussion of Related Art 3D printing, also called additive manufacturing, allows for the production of three-dimensional objects with high precision and accuracy. These objects are built in a layer-by-layer fashion in that solidifiable material is added in layers which layers correspond to successive cross-sections of the final three-dimensional object.

Various types of 3D printing processes are available including SLA (Stereolithography) and DLP (Digital Light Processing) printing. Both rely on the use of light, typically in the UV region of the spectrum to cure a photosensitive material, such as an elastomeric resin.

In SLA printing, an object platform (also referred to as a build platform) is generally immersed into a container containing a bath of liquid resin. When light of a light source, such as a laser, hits pre-defined areas of the resin, it induces photopolymerization, and by sweeping the laser light across the resin layer in a predetermined pattern (the pattern being defined by computer-readable 3D data), a solidified resin layer of a desired shape is obtained. Typically, the laser does not shine directly onto the resin but is instead deflected by a rapidly moving mirror which directs the laser beam onto a desired point. In contrast to SLA printing, DLP printing is not restricted to a single spot, but instead the entire layer is printed at once. This is achieved by using a DLP projector containing a DMD (Digital Micromirror Device). The light, which is generated by a light source, typically a LED, is selectively reflected by the DMD and projected onto the resin layer.

Generally, one distinguishes between "conventional" ("top-down") and "inverted" ("bottom-up") processes depending on the direction along which the light propagates during the object building process. In inverted processes, the object platform moves upwardly and away from the bottom of the tank. The distance between the object platform and the bottom of the container defines one layer thickness. The resin between the object platform and the bottom of the container is then photopolymerized. In a next step, the object platform holding the photopolymerized layer structure moves upwards by at least another layer height, allowing the next layer to be photopolymerized. As a result, the printed object is oriented upside down relative to the finished object due to the object layers being printed successively in a downward direction. In conventional processes, the build platform moves downwardly into the resin bath by an amount enough to leave a thin resin layer on top of the build platform. This resin layer is then cured. Following the curing step, the build platform again moves downwardly, so that the next layer is established on top of the build platform, which can then be cured. Consequently, the finished object is built layer-by-layer with the uppermost layer being the last that was solidified.

Recently, there has been a demand for producing three-dimensional objects from a solidifiable paste, such as silicone, using a 3D printing process. 3D printed silicone parts can widely be used in industry and the medical sector, and enormous cost and time savings can be obtained if they are produced by SLA or DLP printing, instead of injection-moulding. When using highly viscous silicone or in general highly viscous materials in SLA or DLP printing, a problem occurs in that the highly viscous material does not level out by gravity. A flat and smooth surface of the highly viscous material is, however, of paramount importance for the 3D printing process. To address this problem, a spreader is employed to flatten out the highly viscous material prior to the photocuring step.

US 2015/0224710 A1 discloses an apparatus for making a three-dimensional object from a solidifiable paste. To ensure a uniform layer thickness, a spreader is employed which is moved across the bottom of the paste container. The spreader includes a blade with a serrated blade lip. To avoid that solidifiable paste becomes trapped between the spreader and one of the side walls of the container, the spreader includes two blades which are spaced apart from one another along the travelling direction of the spreader.

CN 209718634 U again relates to an apparatus for making a three-dimensional object from a solidifiable paste. It includes a non-rotatable spreader in the form of a tapered blade.

SUMMARY OF THE INVENTION

In view of the foregoing, it is an object of the present invention to mitigate the problems associated with the prior art SLA or DLP printing processes using a highly viscous solidifiable paste, and to further improve the quality thereof. In particular, it is an object of the present invention to avoid the generation of depleted areas in the spread out solidifiable paste prior to the photocuring step.

This object is solved by the subject-matter claimed and described. Optional or preferred features of the present invention are indicated in the dependent claims.

According to the invention, an apparatus for producing a three-dimensional object is provided. The apparatus comprises an energy source of electro-magnetic radiation, an open-top container having a closed bottom and sidewalls, the closed bottom being at least in part transparent for the electro-magnetic radiation, the open-top container being configured to contain solidifiable paste which solidifies in response to the electro-magnetic radiation supplied by the energy source, a build platform configured to move in a vertical direction and positioned vertically above the container, wherein the build platform moves away in the vertical direction from the closed bottom of the container during an object building process; and a paste spreader assembly configured to move horizontally along a first direction during a paste spreading process to evenly spread and define a layer thickness of the solidifiable paste at least in part across the closed bottom of the container. The paste spreader assembly comprises at least one blade having at least one planar facet which faces the bottom of the container. According to the invention, the at least one blade is rotatable from a non-operative position to an operative position around a horizontal axis which is orthogonal to the first direction, and in that one planar facet of the at least one planar facet in the operative position of the at least one blade is at an angle γ relative to the closed bottom of the container and at least partially contacts the paste during the paste spreading process, and in that the angle γ is in a range of 0°≤γ≤45°.

Preferably, the at least one blade has a free end, at which the at least one planar facet is provided.

More preferably, a multiplicity of planar facets are provided at the free end of the at least one blade, and in the operative position, one of the multiplicity of planar facets is at the angle γ relative to the closed bottom of the container.

Yet more preferably, the multiplicity of planar facets are angled to one another.

It is advantageous, if a transition region between two adjacent planar facets of the multiplicity of planar facets is curved.

As a further option, the at least one blade is continuously rotatable around the horizontal axis.

According to another preferred embodiment of the invention, the paste spreader assembly includes two blades which are spaced apart in the first direction, and wherein each blade has a free end with at least one planar facet.

Optionally, the two blades are symmetrical relative to a vertically extending plane which is orthogonal to the first direction.

It is preferable if a cavity is formed between the two blades.

It is more preferable, if the cavity is concave.

It is yet more preferable, if in a vertical cross-section parallel to the first direction, a tangent on a point of the cavity, which meets a leading edge of the planar facet, encloses an angle β of less than 90° with the planar facet.

According to another preferred embodiment of the invention, the two blades are connected to one another at ends opposite the free ends of the two blades.

It is advantageous if the paste spreader assembly is made from a rigid material.

Most preferably, the angle γ is in a range of 0°≤γ≤20°.

BRIEF DESCRIPTION OF SEVERAL VIEWS OF THE DRAWINGS

The present invention will now be described by way of example and with reference to the attached drawings. These drawings are not intended to limit the scope of the invention, but rather represent preferred embodiments thereof.

FIG. 1 shows a perspective view of an apparatus for manufacturing a three-dimensional object using a solidifiable paste according to a preferred embodiment of the invention;

DETAILED DESCRIPTION OF THE INVENTION

Figure 2:
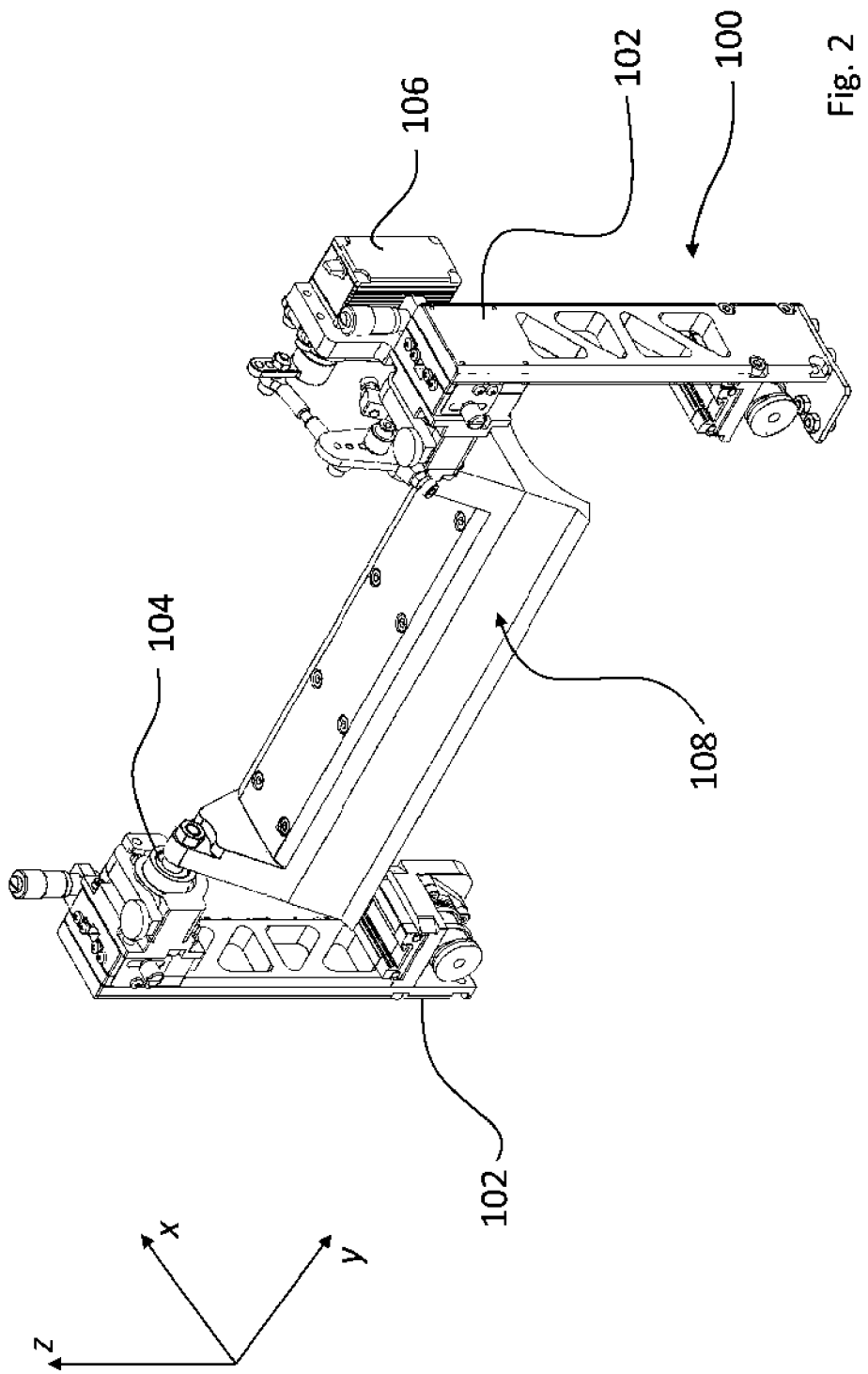
FIG. 2 shows a perspective view of the spreader assembly used in the apparatus shown in FIG. 1.

The present invention is generally applicable to any 3D printing process using a solidifiable paste. Specifically, the present invention is particularly suitable for SLA, DLP and LCD printing processes, or any other process which requires a selective solidification of a previously deposited material layer, or a portion thereof.

Solidifiable paste described herein may comprise polymeric components and non-polymeric components. Preferably, the solidifiable paste is an elastomeric paste, such as silicone. The solidifiable paste is preferably highly viscous, the viscosity of which is preferably in a range of 10 to 1000 Pa·s, more preferably in a range of 50 to 500 Pa·s, even more preferably in a range of 100 to 300 Pa·s, and most preferably in a range of 150 to 200 Pa·s.

FIG. 1 shows a perspective view of an apparatus 1 which is used to produce a three-dimensional object from a solidifiable paste. Also shown in FIG. 1 is a cartesian coordinate system. The x-direction denotes a length direction, the y-direction denotes a width direction, and the z-direction denotes a height direction, with the x-y plane representing a horizontal plane and the z-direction representing the vertical direction.

The apparatus 1 includes a housing assembly which comprises a base portion 2 and a top portion 3. The top portion 3 is offset from the front of the base portion 2, but preferably flush with the rear thereof. Irrespective of whether the apparatus 1 is used for SLP, DLP or LCD 3D printing, all the optics, mechanical drives, projectors, etc. are preferably accommodated within the interior of the base portion 2 and the top portion 3, and for that reason are not shown in FIG. 1.

The upper surface of the base portion 2 supports a container 10 which is configured to receive and contain the solidifiable paste. The container 10 has an open top, a closed bottom 12 and sidewalls 14 which are continuous around the perimeter of the closed bottom 12. For the purpose of solidifying or photopolymerizing (photocuring) the solidifiable paste, the closed bottom 12 includes a transparent window 16 which is transparent to the light or electromagnetic radiation used for the solidification process.

The container 10 is fixed to the upper surface of the base portion 2 by means of two holders 8 which are arranged on opposite sides of the container 10. These holders 8 are fixed to the base portion 2, preferably by means of mechanical fasteners, such as nuts and bolts. The holders 8 serve the purpose to rigidly mount the container 10 in a releasable fashion to the base portion 2.

A build or object platform 20 which serves as a substrate (holder) for the three-dimensional object to be produced, is positioned vertically above the container 10. The build platform 20 is mounted to a vertical carriage which includes two carriage arms 22. The two carriage arms 22 are horizontally spaced apart in the x-direction. These arms 22 extend into longitudinal slots 9. The longitudinal slots 9 extend vertically and are provided at the front of the top portion 3. The arms 22 cooperate with a mechanical drive (not shown) to vertically move the build platform 20 up and down, as needed.

A spreader assembly 100 which will be discussed in more detail with reference to FIG. 2, is movable in a horizontal direction, preferably in the x-direction, i.e., perpendicular to a build axis which corresponds to the vertical z-direction. The spreader assembly 100 cooperates with a mechanical drive (not shown) which is situated inside the bottom portion 2. The length of movement of the spreader assembly 100 is limited by the length of the slots 6 formed in the upper surface of the top portion 2. The slots 6 extend preferably in the x-direction.

FIG. 2 shows the spreader assembly 100 in more detail. The spreader assembly 100 comprises two vertically extending frame members 102. The spreader assembly 100 further includes a blade structure or blade configuration 108 which is shown in more detail in a vertical cross-section parallel to the x-direction in FIG. 3. The blade structure 108 is rotatably supported by the two frame members 102. It can be rotated, preferably in a continuous manner, around a horizontal axis 104, which preferably extends in the y-direction. An electric motor 106, preferably a servomotor, is used to rotate the blade structure 108 either clockwise or counter-clockwise. It is worthwhile to note that other means for rotating the blade structure 108 around the axis 104 may be used.

It is worthwhile to note that the container 10 and the build or object platform 20 may be tilted such that the closed bottom 12 is arranged at an angle with respect to the horizontal x-y plane. Consequently, the motion path of the spreader assembly, in particular that of the blade structure is still along the horizontal direction, yet has a vertical component. In addition, the build platform 20 no longer moves along a trajectory that is strictly vertical, i.e., along the z-direction, but instead moves along a linear off-axis path in the x-z plane. In other words, the motion path of the build platform 20 is still in a vertical direction, but yet also has a horizontal component.

Different embodiments of the blade structure denoted by reference numerals 108, 208, 308, 408 are described below with reference to FIG. 3 to FIG. 7. Different rotational positions of the blade structure 108, 208, 308, 408 are referred to as the first non-operative position and the second operative position, the operative position being that rotational position of the blade structure 108, 208, 308, 408 in which the blade structure is moved across the container 10 to spread out the solidifiable paste. Whilst there can of course be different first non-operative positions, the blade structure 108, 208, 308, 408 may also be rotated into different second operative positions, depending on the angular orientation of a particular aspect (planar facet) of the blade structure 108, 208, 308, 408 with respect to the closed bottom 12 of the container 10, the particular aspect being that planar facet that is intended to come into contact with the solidifiable paste to spread out the same across the closed bottom 12 of the container 10.

Figure 3:
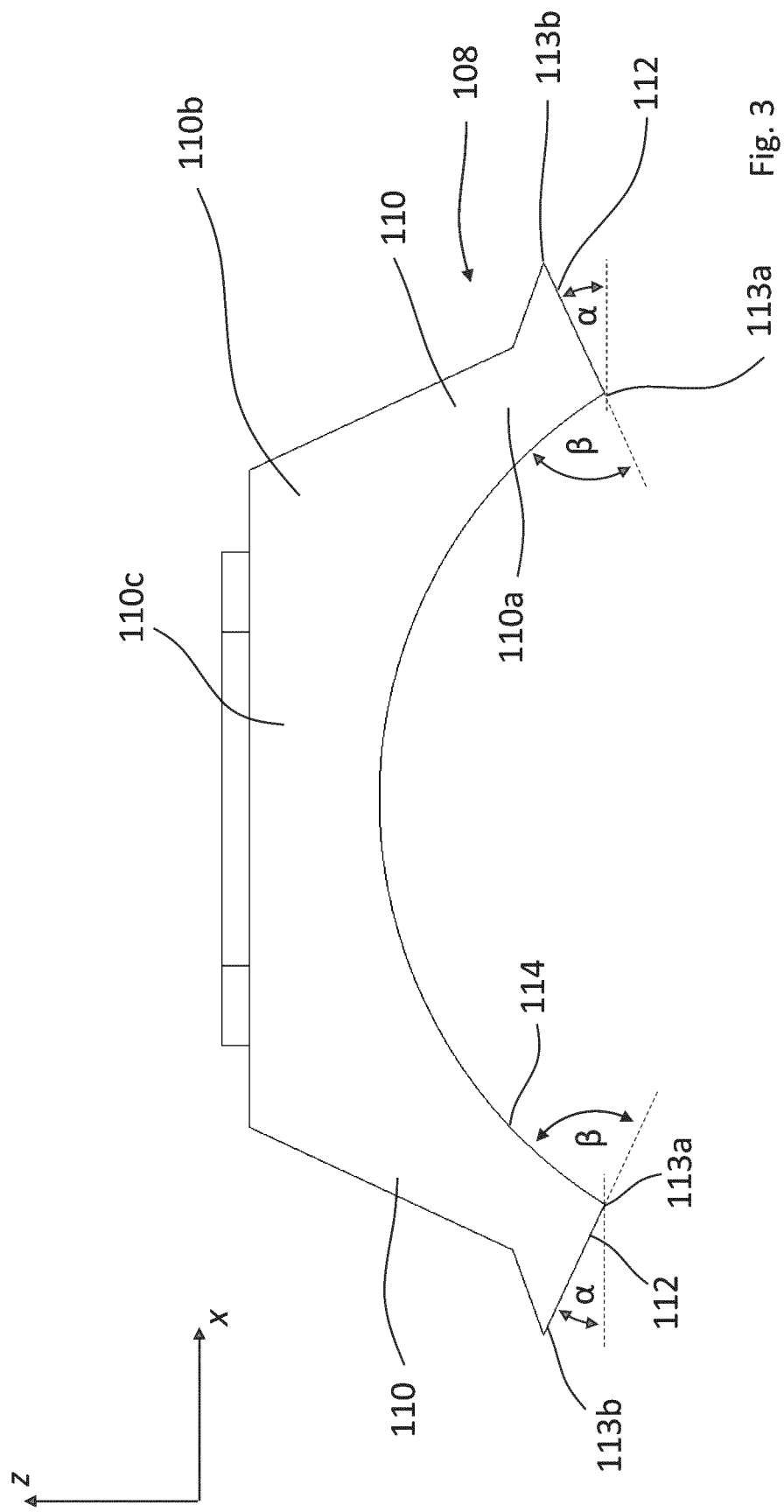
FIG. 3 shows a vertical cross-sectional view of the blade configuration of the spreader assembly of FIG. 2 in a first non-operative position.

The blade structure 108 is shown in more detail in a vertical cross-section parallel to the x-direction in FIG. 3 which depicts the first non-operative position of the blade-structure 108. The blade structure 108 preferably includes two blades 110. The blades 110 are preferably symmetrically configured with respect to a vertical axis or vertical plane. Each blade 110 has on its lower free end 110a a planar facet 112 which is directed towards or faces the closed-bottom 12 of the container 10, and hence the solidifiable paste inside the container 10. At their ends 110b opposite the free ends 110a, the two blades 110 are connected by a bridge member 110c.

The length of the planar facet 112 in the x-direction may preferably be in a range from 0.1 mm to 20 mm, preferably in a range of 5 mm to 10 mm, more preferably in a range from 7 mm to 9 mm. The planar facet 112 preferably has a width (in y-direction) which corresponds to the width of the blade structure 108. In addition, or alternatively, the planar facet 112 preferably has a width (in y-direction) which at least corresponds to the width of the transparent window 16 or at least the width of the three-dimensional object to be printed.

In the first non-operative position of the blade structure 108, each planar facet 112 is sloped upwardly by an angle $\alpha$ relative to the horizontal x-axis. This angle $\alpha$ is preferably in a range of $0° \leq \alpha \leq 90°$, more preferably in a range of $0° \leq \alpha \leq 45°$. The slope angles of the two planar facets 112 are preferably the same and are complementary to each other, i.e., one planar facet 112 includes a positive angle $+\alpha$ relative to the x-axis, whereas the other planar facet 112 includes a negative angle $-\alpha$ relative to the x-axis. In an exemplary second operative position of the blade structure 108 and depending on the travelling direction (+/−x-direction) of the spreader assembly 100, one of the planar facets 112, that is used to spread out the solidifiable paste, is preferably parallel to the closed bottom 12 of the container 10. However, in other second operative positions of the blade structure 108, one of the planar facets 112, that is used to spread out the solidifiable paste, may be angled relative to the closed bottom 12 of the container 10, preferably by an angle $\gamma$ which is equal to or smaller than the angle $\alpha$. Preferably, the angle $\gamma$ is in a range of $0° \leq \gamma \leq 45°$, more preferably in a range of $0° \leq \gamma \leq 20°$. The angle $\gamma$ is defined as the angle between the planar facet, that is used to spread out the solidifiable paste, and the closed bottom 12 of the container 10.

In addition, and again depending on the travelling direction (+/−x-direction) of the spreader assembly 100, each planar facet 112 has a leading edge 113a and a trailing edge 113b. For example, if the spreader assembly 100 moves in the +x-direction, the planar surface 112 of the left blade 110 in FIG. 3 has a leading edge 113a and a trailing edge 113b. Vice versa, if the spreader assembly 100 moves in the −x-direction, the planar surface 112 of the right blade 110 in FIG. 3 has a leading edge 113a and a trailing edge 113b.

A cavity 114 is provided between the two blades 110. The cavity 114 is preferably concave but may also have other shapes, such as an elliptical, polygonal, arc-shaped, curvilinear or even simply a rectangular shape, as seen in a x-z cross-section. Important to note is that in a vertical cross-section parallel to the x-axis, a tangent on a lowermost point of the cavity 114, which meets the leading edge 113a of the planar facet 112, preferably encloses an angle $\beta$ of less than 90° with the planar facet 112.

Figure 4:
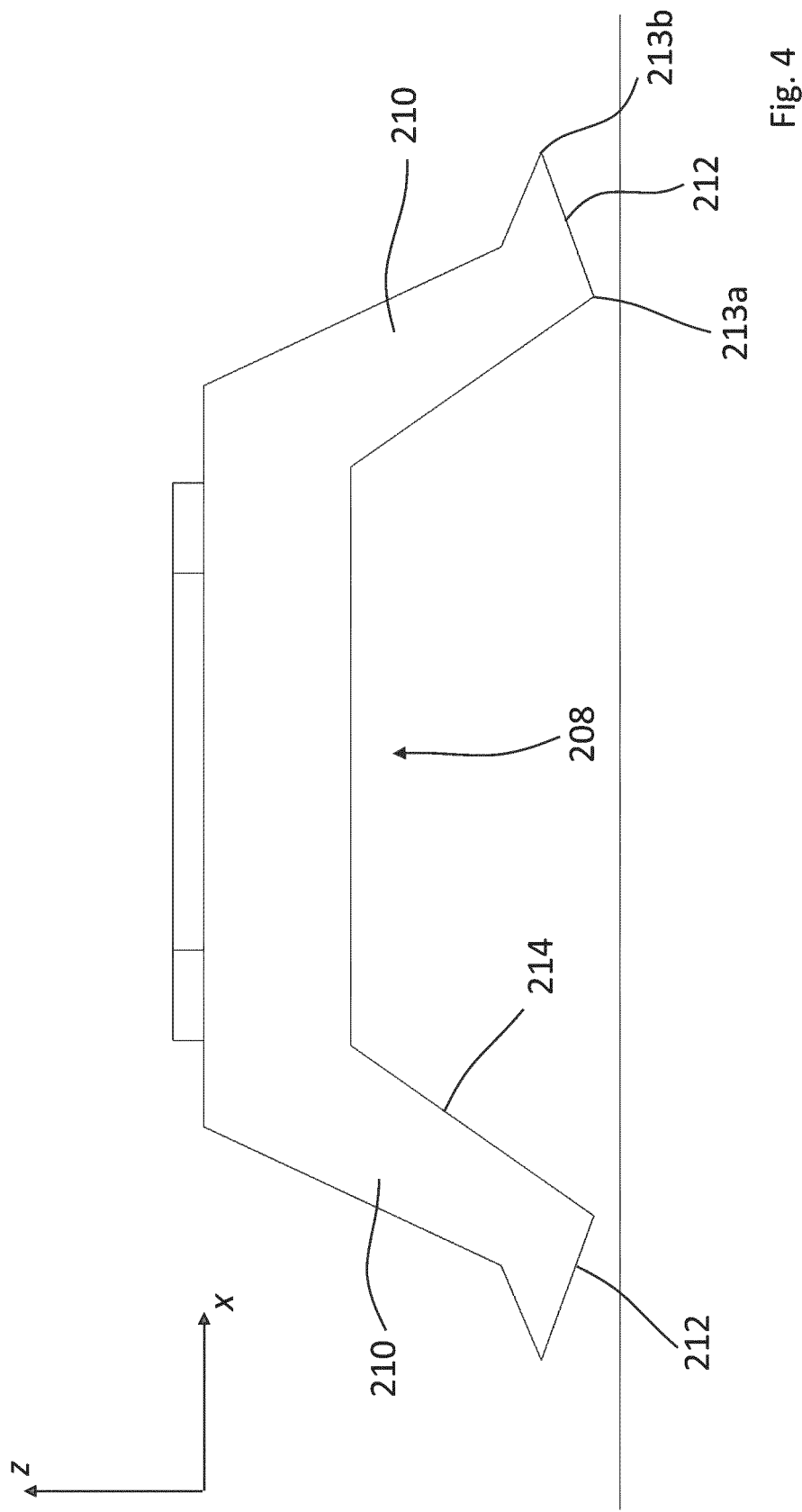
FIG. 4 shows a vertical cross-sectional view of a blade configuration of a spreader assembly according to another embodiment of the invention in a first non-operative position.

FIG. 4 shows a blade structure 208 of a spreader assembly according to another embodiment of the invention in the second non-operative position. The blade structure 208 differs from the blade structure 108 shown in FIG. 3 in that the cavity 214 between the two blades 210 has a different shape or geometry than the cavity 114 of the blade structure 108 of FIG. 3. In FIG. 4, the cavity 208 is curvilinear. As in the embodiment of FIG. 3, in a vertical cross-section parallel to the x-axis, a tangent on a lowermost point of the cavity 214, which meets the leading edge 213a of the planar facet 212, encloses an angle $\beta$ of less than 90° with the planar facet 212.

Figure 5:
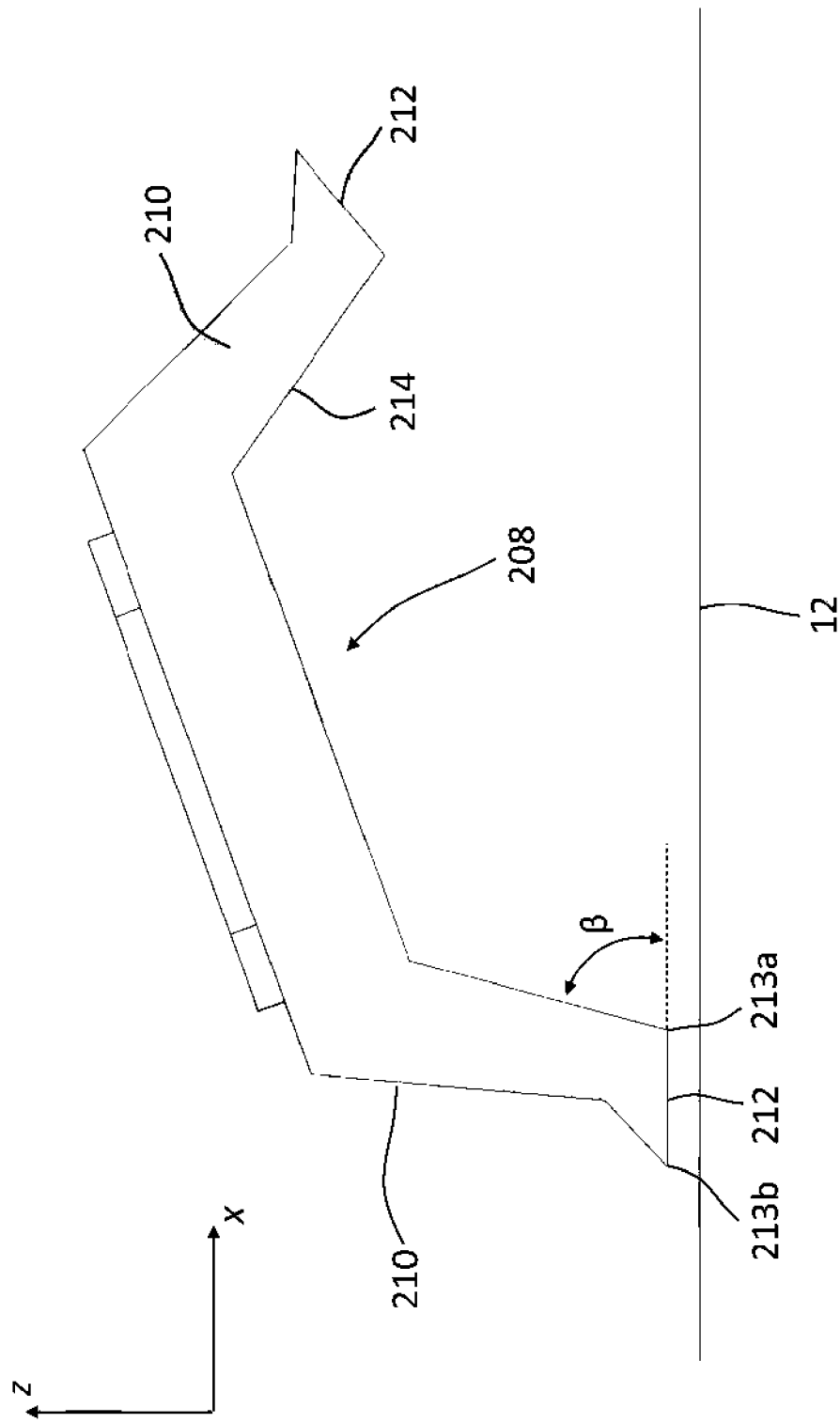
FIG. 5 shows the blade configuration of FIG. 4 in an exemplary second operative position.

FIG. 5 shows the blade structure 208 of FIG. 4 in an exemplary second operative position, with the straight horizontal line indicating the closed bottom 12 of the container 10. In FIG. 5, the blade structure 208 is understood to move in the +x-direction, so that the leading edge 213a is ahead of the trailing edge 213b. The angle β is also shown in FIG. 5. The planar facet 212 in this exemplary second operative position of the blade structure 208 is parallel to the closed-bottom 12 of the container 10.

Figure 6:
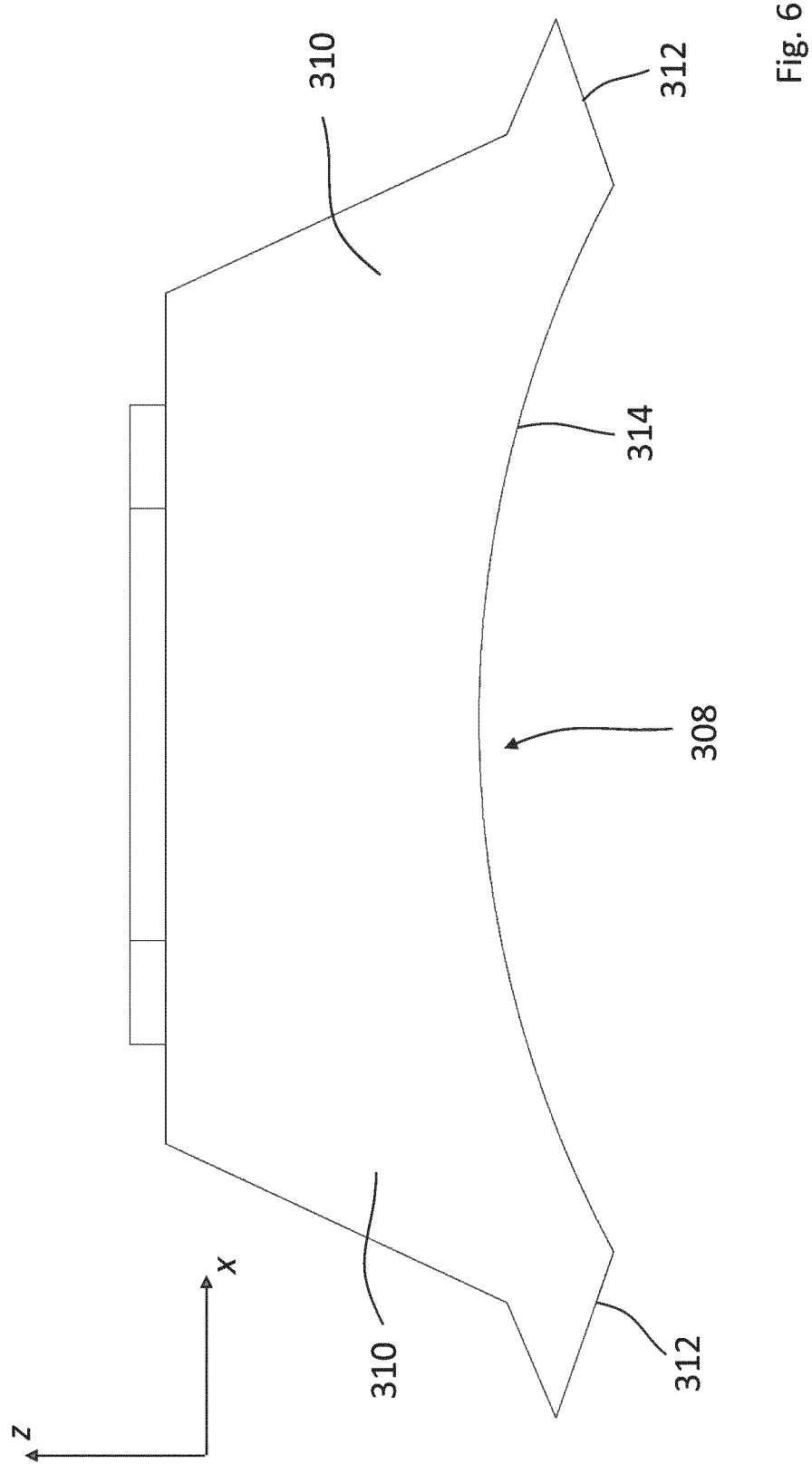
FIG. 6 shows a vertical cross-sectional view of a blade configuration of a spreader assembly according to a further embodiment of the invention in a first non-operative position.

FIG. 6 shows a blade structure 308 of a spreader assembly according to yet another embodiment of the invention in a first non-operative position. The blade structure 308 differs from the blade structure 108 of FIG. 3 in that the cavity 314 between the two blades 310 has a different shape or geometry than the cavity 114 of the blade structure 108 of FIG. 3. As in FIG. 3, the cavity 308 is again concave. However, a radius of curvature of the cavity 308 is larger than the radius of curvature of the cavity 108 of FIG. 3. As a result thereof, the angle β in the embodiment of FIG. 5 is smaller than the angle β in the embodiment of FIG. 3.

Figure 7:
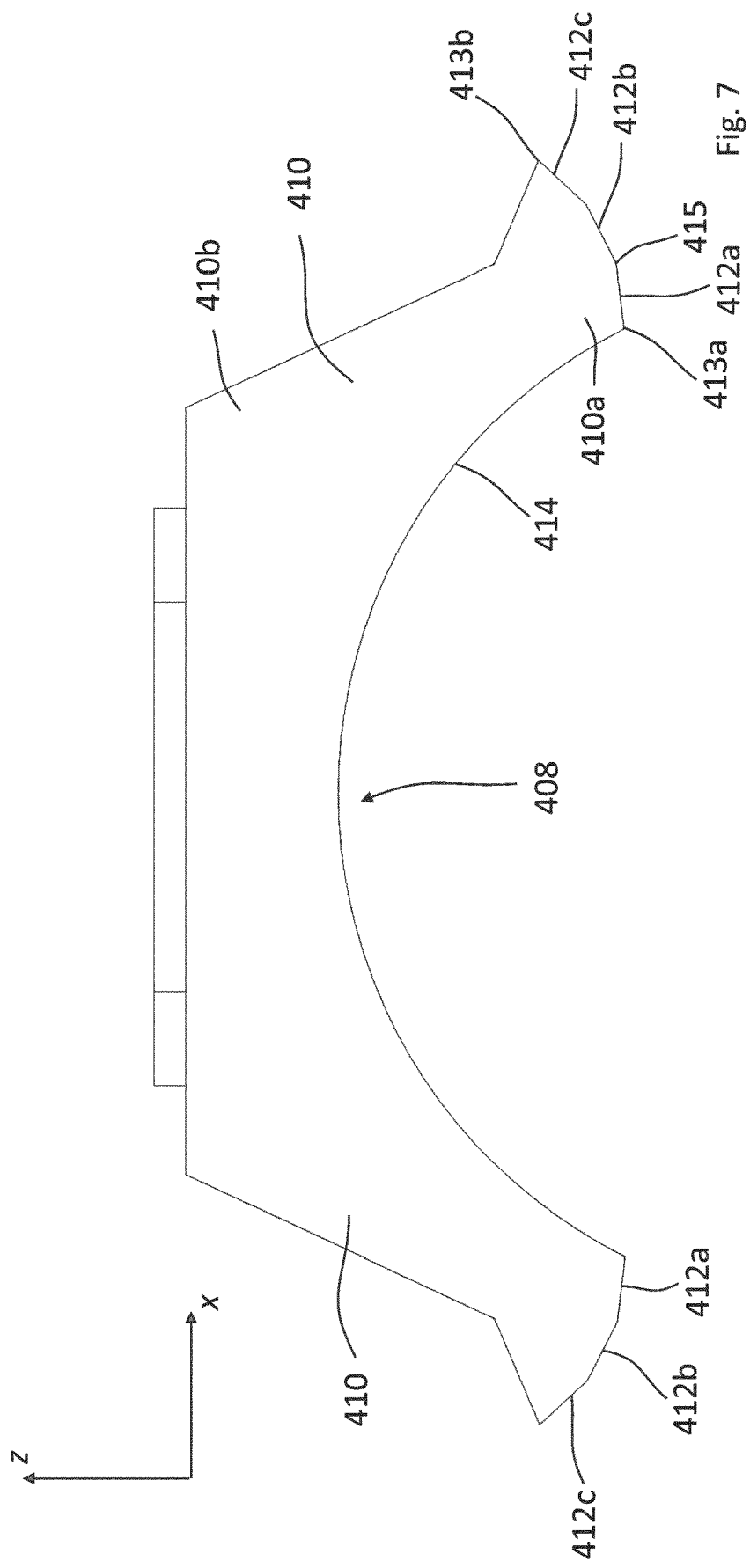
FIG. 7 shows a vertical cross-sectional view of a blade configuration of a spreader assembly according to yet another embodiment of the invention in a first non-operative position.

With reference to FIG. 7, yet another preferred embodiment of the invention is shown. According to this embodiment, a blade structure 408 may be provided with a multiplicity of planar facets 412a, 412b, 412c at the free end 410a of each blade 410. The multiplicity of planar facets 412a, 412b, 412c are angled relative to each other and so define a curvilinear paste spreading surface. These angles may be the same between two adjacent planar facets or may increase (or decrease) from the innermost planar facet 412a towards the outermost planar facet 412c. Unlike in FIG. 7, any transition region 415 between two adjacent planar facets 412a, 412b may preferably be rounded or curved. As in the embodiment of FIG. 3, in a vertical cross-section parallel to the x-axis, a tangent on a lowermost point of the cavity 414, which meets the leading edge 413a of the planar facet 412a (the innermost planar facet 412a of the multiplicity of planar facets 412a, 412b, 412c), encloses an angle β of less than 90° with the innermost planar facet 412a.

As to all embodiments of the invention disclosed herein, when solidifiable paste is injected into the container, preferably through a port (not shown) provided on one of the sidewalls of the container in the vicinity of the closed bottom, the solidifiable paste due to its high viscosity tends not to flow due to gravity by itself. Thus, there may be depleted areas on the closed bottom of the container where solidifiable paste is missing. The spreader assembly, specifically the blade structure is then lowered and brought into an operative position by rotating the blade structure such that one planar facet is angled by the angle γ relative to and spaced apart by a predetermined distance from the closed bottom of the container. The blade structure is then moved horizontally, for example in the x-direction, to evenly spread out the solidifiable paste over the closed bottom, preferably only over the transparent window provided in the closed bottom, and to remove excess paste in some areas and fill up any depleted areas with paste.

The fact that the blade structure can be rotated, preferably continuously, ensures varying layer thicknesses during printing, even if each blade of the blade structure has only one planar facet. By adjusting the rotational position of the blade, the blade structure may assume different operative positions, so that varying portions of the planar facet (alternatively varying portions of one of the planar facets or even varying planar facets, if several of them are provided at the free end of the blade structure) will contact the paste during the paste spreading process. Thus, the thickness of consecutive layers may be varied to either achieve faster, but less detailed, or slower, but more detailed, 3D printing. In addition, multiple operating positions with varying spreading angle γ may allow the printer to coat or print a variety of resins with different rheological properties.

It is even conceivable that the angle γ is changed after each turn during the reciprocating movement of the blade structure in the +x and −x directions as a result of which the planar facet has a varying angle γ relative to the closed-bottom of the container during the entire printing process.

In case of each blade having a multiplicity of planar facets which are angled relative to one another, a larger range of varying layer thicknesses can be obtained. With the invention, the layer thickness may preferably be in a range from 0.001 mm to 1 mm, yet more preferably 0.01 mm to 1 mm.

In addition, the blade structure is configured such that it can be positioned against the sidewall of the container at which the paste injection port is located. The solidifiable paste is then injected into the container and into the cavity of the blade structure. The cavity and its volume thus act as a reservoir for the solidifiable paste to fill all depleted areas on the closed bottom of the container.

The angle γ and/or the geometry of the cavity, in particular the angle β may be selected depending on the viscosity of the paste. By varying the angle γ and/or the angle β, the vertical and horizontal components of the force exerted on the paste by the respective blade may be balanced. For example, by choosing a small angle γ and/or a small angle β, the vertically acting component of this force can be increased. This is particularly advantageous in the context of shear-thinning paste materials. Due to a smaller angle γ and/or a smaller angle β, shear forces are exerted to the shear-thinning paste material which temporarily lowers the viscosity of the paste prior to the paste spreading step. Thus, the spreading process is facilitated.

In general, with the use of the spreader assembly according to the invention, the paste spreading process requires less time because of the high speed with which the spreader assembly can be moved. This, in turn, yields a faster and more economic 3D printing process.

The invention claimed is:

1. An apparatus (1) for producing a three-dimensional object, comprising:
   an energy source of electro-magnetic radiation;
   an open-top container (10) having a closed bottom (12) and sidewalls (14), the closed bottom (12) being at least in part transparent for the electro-magnetic radiation, the open-top container (10) being configured to contain solidifiable paste which solidifies in response to the electro-magnetic radiation supplied by the energy source;
   a build platform (20) configured to move in a vertical direction and positioned vertically above the container (10), wherein the build platform (20) moves away in the vertical direction from the closed bottom (12) of the container (10) during an object building process; and
   a paste spreader assembly (100) configured to move horizontally along a first direction during a paste spreading process to evenly spread and define a layer thickness of the solidifiable paste at least in part across the closed bottom (12) of the container (10);
   wherein the paste spreader assembly (100) comprises at least one blade (110) having at least one planar facet (112) which faces the bottom of the container,
   wherein the at least one blade (110) is rotatable from a non-operative position to an operative position around a horizontal axis (104) which is orthogonal to the first direction, and in that one planar facet (112) of the at least one planar facet in the operative position of the at least one blade (110) is at an angle γ relative to the closed bottom (12) of the container (10) and at least partially contacts the paste during the paste spreading process, and in that the angle γ is in a range of 0°≤γ≤45°, wherein the paste spreader assembly (100) includes two blades (110) which are spaced apart in the first direction, and wherein each blade (110) has a free end (110a) with at least one planar facet (112), wherein a cavity (114) is formed between the two blades (110), which cavity is arc-shaped in a cross-section parallel to the first direction.

2. The apparatus (1) according to claim 1, wherein the at least one blade (110) has a free end (110a), at which the at least one planar facet (112) is provided.

3. The apparatus (1) according to claim 2, wherein a multiplicity of planar facets (412a, 412b, 412c) are provided at the free end (410a) of the at least one blade (410), and wherein in the operative position, one of the multiplicity of planar facets (412a, 412b, 412c) is at the angle γ relative to the closed bottom (12) of the container (10).

4. The apparatus (1) according to claim 3, wherein the multiplicity of planar facets (412a, 412b, 412c) are angled to one another.

5. The apparatus (1) according to claim 3, wherein a transition region (415) between two adjacent planar facets (410a, 410b) of the multiplicity of planar facets (412a, 412b, 412c) is curved.

6. The apparatus (1) according to claim 1, wherein the at least one blade (110) is continuously rotatable around the horizontal axis (104).

7. The apparatus (1) according to claim 1, wherein the two blades (110) are symmetrical relative to a vertically extending plane which is orthogonal to the first direction.

8. The apparatus (1) according to claim 1, wherein the cavity (114) is concave.

9. The apparatus (1) according to claim 1, wherein in a vertical cross-section parallel to the first direction, a tangent on a point of the cavity (114), which meets a leading edge (113a) of the planar facet (112), encloses an angle β of less than 90° with the planar facet (112).

10. The apparatus (1) according to claim 1, wherein the two blades (110) are connected to one another at ends (110b) opposite the free ends (110a) of the two blades (110).

11. The apparatus (1) according to claim 1, wherein the paste spreader assembly (100) is made from a rigid material.

12. The apparatus (1) according to claim 1, wherein the angle γ is in a range of 0°≤γ≤20°.

* * * * *